United States Patent [19]

Haren et al.

[11] 3,928,521

[45] Dec. 23, 1975

[54] METHOD OF MAKING MICROPOROUS ELASTOMERIC MATERIAL

[75] Inventors: Doyle V. Haren, Clyde; Arthur D. Logan, Waynesville, both of N.C.

[73] Assignee: Dayco Corporation, Dayton, Ohio

[22] Filed: Dec. 27, 1973

[21] Appl. No.: 428,965

[52] U.S. Cl. ............... 264/49; 156/215; 260/2.5 B; 260/2.5 M; 264/53; 264/209; 264/DIG. 5
[51] Int. Cl.² ............................................ B29H 7/20
[58] Field of Search ........ 260/2.5 B, 2.5 M, 2.5 AE, 260/2.5 AY; 264/49, DIG. 5

[56] References Cited
UNITED STATES PATENTS

| | | | |
|---|---|---|---|
| 2,329,322 | 9/1943 | Baty | 264/49 |
| 3,309,439 | 3/1967 | Nonweiler | 260/2.5 B |
| 3,375,209 | 3/1968 | Kemper | 264/49 |
| 3,379,658 | 4/1968 | Kemper | 264/49 |
| 3,751,392 | 8/1973 | Olstowski | 260/2.5 AE |

*Primary Examiner*—Paul R. Michl
*Attorney, Agent, or Firm*—Reuben Wolk

[57] ABSTRACT

A method of making a microporous elastomeric material having interconnected cavities and which may be used in an ink dispensing article is provided wherein such material is made by the steps of, admixing particles of hydrated magnesium sulfate in an elastomeric matrix material, curing the elastomeric matrix material and simultaneously causing liberation of water of crystallization from the hydrated magnesium sulfate which provides a blowing effect resulting in the formation of interconnecting passages between the particles, and leaching the particles from the matrix material, the leaching being achieved in an accelerated manner due to the interconnecting passages.

15 Claims, 5 Drawing Figures

METHOD OF MAKING MICROPOROUS ELASTOMERIC MATERIAL

BACKGROUND OF THE INVENTION

Microporous rubber materials are widely used throughout industry for various purposes including ink dispensing rollers, pads, and the like. It is well known in industry that microporous materials may be made using methods or processes which empoly non-hydrated soluble salts such as sodium chloride or sodium nitrate, for example. However, such methods which use non-hydrated salts increase the overall cost of the microporous material due to the excessive time required and difficulty in removing the particular salt utilized from the rubber material by leaching process.

SUMMARY

This invention provides an improved method of making a microporous elastomeric material and method of making an ink dispensing article having such microporous material provided as a portion thereof and such material has interconnected cavities or pores throughout. The method comprises the steps of, admixing particles of hydrated magnesium sulfate in an elastomeric matrix material, curing the elastomeric matrix material and simultaneously causing liberation of water of crystallization from said hydrated magnesium sulfate which provides a blowing effect resulting in the formation of interconnecting passages between said particles, and leaching said particles from the matrix material, said leaching bring achieved in an accelerated manner due to said interconnecting passages.

Other details, uses, and advantages of this invention will be readily apparent from the embodiments thereof presented in the following specification, claims, and drawing.

BRIEF DESCRIPTION OF THE DRAWING

The accompanying drawing shows present exemplary embodiments of this invention, in which.

DETAILED DESCRIPTION

Figure 1:
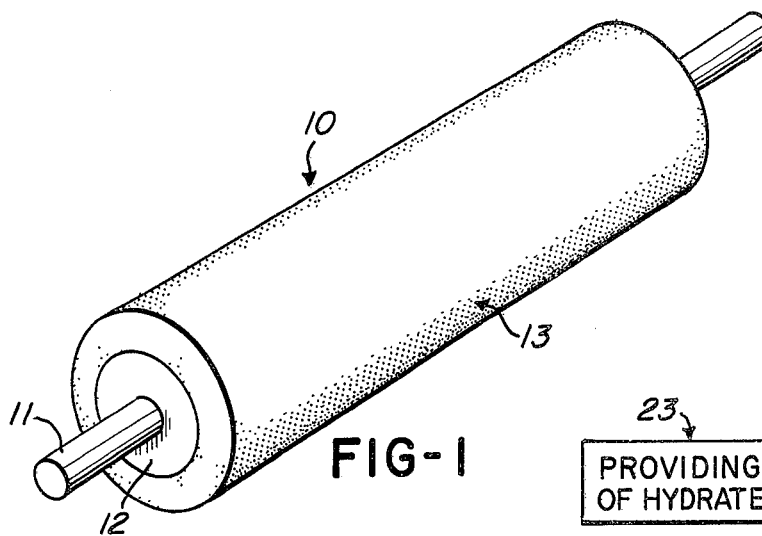
FIG. 1 is a perspective view illustrating an exemplary ink dispensing roll made utilizing the method of this invention.

Reference is now made to FIG. 1 of the drawing which illustrates an exemplary ink-dispensing article or roll which is designated generally by the reference numeral 10. The roll 10 has a central shaft 11 provided with a cylindrical supporting portion 12 which is detachably fixed concentrically around the shaft 11 and an outer tubular microporous elastomeric material in the form of a microporous rubber material 13 is fixed against the supporting portion 12. The material 13 is made utilizing the method of this invention and is suitably filled or saturated with ink, or the like, in accordance with techniques which are well known in the art and as will be described in more detail subsequently.

Figure 2:
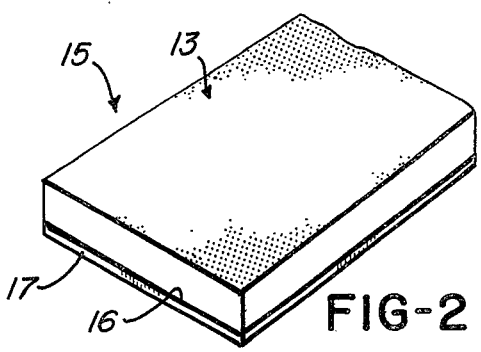
FIG. 2 is a fragmentary perspective view illustrating an exemplary ink dispensing pad made utilizing the method of this invention.

Another exemplary ink-dispensing article in the form of a pad is shown in FIG. 2 and such pad is designated generally by the reference numeral 15. The pad employs a microporous rubber material which is also designated by the reference numeral 13 and the material 13 is fixed by a suitable adhesive means 16 to a comparatively rigid supporting plate which is shown as a metal plate 17 and in accordance with techniques which are well known in the art.

Figure 3:
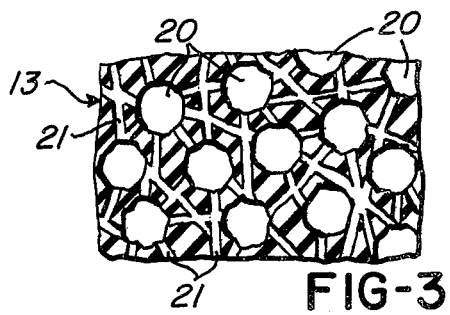
FIG. 3 is an enlarged fragmentary cross-sectional view particularly illustrating the microporous elastomeric material of this invention which comprises the ink dispensing roll or pad of FIGS. 1 and 2 and particularly illustrating, in an exaggerated manner, cavities which for convenience of drawing are of roughly equal size interconnected by numerous internal channels which promote leaching.

The microporous rubber material or composition 13 comprising the ink dispensing roll 10 and the ink dispensing pad 15 is illustrated in FIG. 3 and has a plurality of cavities 20 which are interconnected by internal passages or channels 21 generally of different sizes. The cavities 20 have different irregular shapes, determined by the manner in which they are formed, and may be of roughly equal size or different sizes. The microporous material 13 is capable of dispensing ink, or similar substances, in a uniform manner and in a manner which is considered superior to previously proposed microporous elastomeric materials.

The unique method of making the microporous elastomeric material 13 will now be described in detail in connection with FIG. 4 of the drawing. In particular, sized particles of hydrated magnesium sulfate are provided as indicated at 23 and such particles may be provided by grinding action with the sizing being achieved employing a suitable mechanical screen, or the like.

Figure 5:
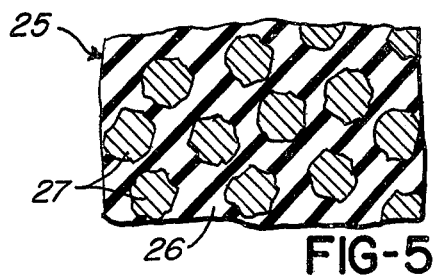
FIG. 5 is an enlarged fragmentary cross-sectional view illustrating elastomeric matrix material loaded with hydrated magnesium sulfate prior to curing and leaching.

The sized particles are then suitably admixed in an elastomeric matrix material as indicated at 24; and, although any known technique may be employed to achieve the mixing action such mixing is preferably achieved by introducing the sized particles together with the elastomeric or rubber compound in a Banbury mill to define (as shown in FIG. 5) a loaded rubber matrix material 25, i.e., a rubber matrix material 26 loaded with sized particles 27 of hydrated magnesium sulfate.

Figure 4:
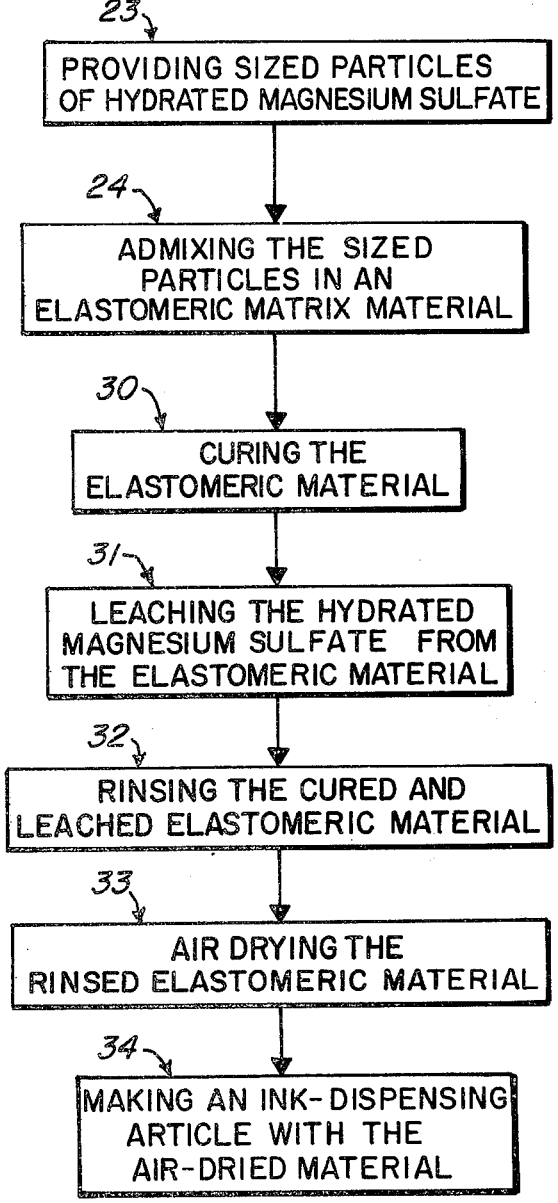
FIG. 4 is a schematic presentation particularly setting forth method steps which may be employed in making the microporous elastomeric ink dispensing article of this invention.

The loaded material comprised of the rubber material or compound 26 with its sized particles 27 of hydrated magnesium sulfate is then cured and leached as illustrated at 30 and 31 respectively in FIG. 4. During the curing of the elastomeric rubber material there is a substantially simultaneous liberation of water of crystallization from the hydrated magnesium sulfate which provides a blowing effect resulting in the formation of the interconnecting passages 21 between the particles of magnesium sulfate. During the leaching of the particles from the matrix material the leaching is achieved in an accelerated manner due to the numerous interconnecting passages 21 which make possible a more efficient leaching action to thereby completely define microporous material 13 having cavities 20 interconnected by passages 21.

The cured and leached rubber material with the interconnected microporous cavities defined therein is suitably rinsed as indicated at 32 to remove any residual magnesium sulfate which may be present thereon whereupon any residual water is removed from the microporous material 13 by air drying as indicated at 33. The drying process may be accelerated, if desired, by prior removal of excess water by mechanical action such as squeezing, or by other suitable means.

Following air drying of the material 13 an ink dispensing article is made and this may be achieved by making a tubular member for the roll 10 which as indicated previously is designated by the numeral 13 or a flat member for the pad 15 which is also designated by the numeral 13.

It should be appreciated that the tubular member 13 of the roll 10 may be made by any suitable technique known in the art, including by extrusion thereof in tubular form using the loaded material 25 prior to curing and leaching or by suitably forming of a flat sheet which is cured, leached, and then wrapped in tubular form around the supporting portion 12 and fixed thereto. However, regardless of the manner in which the tubular member 13 is made or formed it is suitably fixed to the supporting rotatable support or hub portion 12 in accordance with well known techniques to complete the ink-dispensing roll 10.

Similarly, the microporous elastomeric sheet portion 13 is suitably cut to the desired configuration and fixed by adhesive means 16 to the support plate 17 using any known technique to define the ink-dispensing pad 15.

Once the microporous material 13 is fixed or bonded in position on its associated roll 10 or pad 15, ink is loaded therein using any technique which is known in the art. Depending on the ink used and the detailed character of the elastomeric material, the ink may be heated to a predetermined temperature such as 150°F, for example, to facilitate saturation thereof in the material 13. Also vacuum and/or pressure may be used to facilitate saturation.

Having described the improved method of this invention the detailed description will now proceed with details of the size of the particles 17, the extent of hydration of the magnesium sulfate, the amount of hydrated magnesium sulfate which may be employed in an elastomeric matrix, and finally specific examples of the method of this invention. In particular, during the step of providing sized particles of hydrated magnesium sulfate the sizing is preferably such that roughly "100 mesh" particles are provided and what is meant by "100 mesh" will be described in more detail subsequently. The hydrated magnesium sulfate preferably contains seven molecules of water of crystallization per molecule of magnesium sulfate and the formula is written $MgSO_4.7H_2O$. The amount of hydrated magnesium sulfate which may be used in the microporous material 13 may comprise between 40 and 75% of the total volume of the material 13.

EXAMPLE

Sized particles of "100 mesh" hydrated magnesium sulfate containing 7 molecules of water of crystallization per molecule of magnesium sulfate are provided by grinding and sizing is achieved using a mechanical screen. The sized particles are thoroughly mixed in a suitable rubber matrix material in a Banbury mill to define a loaded rubber material 25. The loaded rubber material 25 is then simultaneously cured and leached in a tank of hot water at a temperature of 168°F for a time period of 24 hours. The residual salt is then rinsed from the cured and leached rubber using ordinary tap water at room ambient temperature for approximately one minute. The cured, leached, and rinsed rubber material is dried in an oven which is controlled at a temperature ranging between 300° and 350°F for a length of time sufficient to drive off any residual water whereby some post curing may also be provided and the microporous elastomeric material 13 is completed and may be used in the roll 10 or pad 15.

In the above example, the curing and leaching is achieved in a single step; however, it is to be understood that the curing and leaching may be achieved in separate steps and when thus achieved the curing may be achieved before, simultaneously with, or after the leaching step.

It will also be appreciated that hydrated magnesium sulfate containing other than 7 molecules of water per molecule of magnesium sulfate may be provided. In addition, in those instances where curing and leaching is achieved in a single step the time required for such single-step curing and leaching may range between 10 hours and 72 hours as a function of the dimensions of the article being processed and the temperature of the hot water employed, which may range between 150°F and 212°F.

The material 13 illustrated and described in this disclosure of the invention is cross-hatched in the drawing as a rubber material and such rubber material may be either a natural rubber or a synthetic rubber compound. However, it is to be understood that any suitable elastomeric material may be used to define the microporous material of this invention.

In this disclosure of the invention "100 mesh" particles of hydrated magnesium sulfate have been specifically mentioned; however, it is to be understood that particles of other sizes may be provided. For example, such particles may be as small as 200 mesh size or larger than 100 mesh depending upon the size of the cavities or pores desired in the microporous material.

Actually, the 100 mesh" particles of magnesium sulfate material were chosen for making an ink-dispensing article, based on what is considered to be the largest pore size which will yield a satisfactory balance between ink pickup characteristics, ink feed to a surface being printed, and freedom from so-called "misting" or ink spin-off when running.

A typical screen analysis for the "100 mesh" particles is presented below where the 100 mesh screen has an aperture measuring 0.0058 inch square, while the 140 mesh screen has an aperture measuring 0.0041 inch square.

| | |
|---|---|
| Particles retained on 80 mesh screen | 0.0% |
| Particles retained on 100 mesh screen | 5.0% |
| Particles retained on 140 mesh screen | 13.7% |
| Particles smaller than 140 mesh screen | 81.3% |
| | 100.0% |

From the above screen analysis, it is seen that 95% of all the material is smaller than 100 mesh, while 81.3% is smaller than 140 mesh.

As previously mentioned, the amount of hydrated magnesium sulfate in the material 13 may comprise 40 to 75% of the total volume of such material. During actual laboratory tests it was found that after the improved leaching action provided by the method of this invention, about 95% and more of the soluble materials had in fact been leached out and the resulting microporous material had an actual void volume of about 61% which will be considered as generally of the order of 60%. Void measurements were made indirectly by determining the weight of samples before and after leaching and drying. As a crosscheck, the ink pickup of each sample was determined on a weight basis. From this information, ink pickup was converted to a volume basis and it was found that the volume of ink absorbed was about 58% of the total apparent volume of each sample; i.e., 58% of the sample was void volume that had been filled with ink. This compared quite well with the 61% void volume determined by removal of soluble components and suggests that a small portion of the void volume was uninked, due either to insufficient soak time or possibly viscosity effects in the ink.

While present exemplary embodiments of this invention, and methods of practicing the same, have been illustrated and described, it will be recognized that this invention may be otherwise variously embodied and practiced within the scope of the following claims.

What is claimed is:

1. A method of making an ink-dispensing article comprising the steps of; forming a microporous rubber ink-dispensing material which has interconnected cavities, said forming step comprising the steps of, admixing sized particles of hydrated magnesium sulfate in a rubber matrix material, curing the rubber matrix material and simultaneously causing liberation of water of crystallization from said hydrated magnesium sulfate which provides a blowing effect resulting in the formation of interconnecting passages between said particles, and leaching said particles from said matrix material, said leaching being achieved in an accelerated manner due to said interconnecting passages; and fixing the microporous material to an associated support means to define said article.

2. A method as set forth in claim 1 in which said fixing step comprises fixing said microporous material in tubular form on a rotatable support to define an ink-dispensing roll.

3. A method as set forth in claim 1 in which said fixing step comprises fixing said microporous material in flat form on a flat support plate to define an ink-dispensing pad.

4. A method as set forth in claim 1 in which the admixing step comprises the preparation steps of grinding hydrated magnesium sulfate and sizing the ground hydrated magnesium sulfate by passing the ground material through a screen and said admixing step is achieved employing a Banbury mill.

5. A method as set forth in claim 1 in which said admixing step comprises admixing said sized particles of hydrated magnesium sulfate in an amount so that they comprise between 40 and 75% of the volume of the microporous material formed by said forming step.

6. A method as set forth in claim 1 in which said admixing step comprises admixing said sized particles of hydrated magnesium sulfate in an amount so that they comprise generally of the order of 60% of the void volume of the microporous material formed by said forming step.

7. A method as set forth in claim 1 in which said admixing step comprises the preparation steps of grinding and sizing hydrated magnesium sulfate containing 7 molecules of water of crystallization per molecule of magnesium sulfate.

8. A method as set forth in claim 7 in which said preparation steps of grinding and sizing said hydrated magnesium sulfate comprises grinding and sizing said hydrated magnesium sulfate to provide particles wherein about 95% of said particles pass through a 100 mesh screen and about 81% of said particles pass through a 140 mesh screen.

9. A method as set forth in claim 7 wherein said forming step further comprises the step of rinsing the cured and leached rubber material.

10. A method as set forth in claim 4 in which said curing and leaching steps are achieved in a simultaneous manner.

11. A method as set forth in claim 10 in which said curing and leaching steps are achieved using hot water at a temperature in excess of 150°F.

12. A method as set forth in claim 1 in which said curing and leaching steps are achieved simultaneously by immersing the rubber matrix material containing the sized particles of hydrated magnesium sulfate in a tank of water which is controlled to temperature ranging between 150° and 212°F.

13. A method as set forth in claim 12 wherein said forming step comprises the further steps of rinsing the microporous rubber material with tap water at room ambient temperature and drying the cured, leached, and rinsed material in an oven at a temperature ranging between 300° and 350°F.

14. A method as set forth in claim 7 in which said preparation steps of grinding and sizing said hydrated magnesium sulfate comprises grinding and sizing said hydrated magnesium sulfate to provide particles of roughly 100 mesh size.

15. A method as set forth in claim 14 in which said sizing step comprises employing at least one mechanical screen to achieve said sizing and said admixing step comprises admixing said sized particles so that they comprise generally of the order of 60% of the void volume of the microporous material formed by said forming step.

* * * * *